US011651563B1

(12) United States Patent
Arsan et al.

(10) Patent No.: US 11,651,563 B1
(45) Date of Patent: *May 16, 2023

(54) DOCKABLE BILLBOARDS FOR LABELING OBJECTS IN A DISPLAY HAVING A THREE DIMENSIONAL PERSPECTIVE OF A VIRTUAL OR REAL ENVIRONMENT

(71) Applicant: SPLUNK INC., San Francisco, CA (US)

(72) Inventors: Roy Arsan, Sunnyvale, CA (US); Alexander Raitz, San Francisco, CA (US); Clark Allan, San Jose, CA (US); Cary Glen Noel, Pleasant Hill, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/169,001

(22) Filed: Feb. 5, 2021

Related U.S. Application Data

(63) Continuation of application No. 16/515,429, filed on Jul. 18, 2019, now Pat. No. 10,916,063, which is a continuation of application No. 14/266,511, filed on Apr. 30, 2014, now Pat. No. 10,380,799.

(60) Provisional application No. 61/860,882, filed on Jul. 31, 2013.

(51) Int. Cl.
*G06T 19/00* (2011.01)
*G06F 3/01* (2006.01)

(52) U.S. Cl.
CPC ............ *G06T 19/006* (2013.01); *G06F 3/011* (2013.01)

(58) Field of Classification Search
None
See application file for complete search history.

(56) References Cited

U.S. PATENT DOCUMENTS

| | | |
|---|---|---|
| 5,528,735 A | 6/1996 | Strasnick et al. |
| 6,111,578 A | 8/2000 | Tesler |
| 6,188,403 B1 | 2/2001 | Sacerdoti et al. |

(Continued)

OTHER PUBLICATIONS

Bitincka, L., "Optimizing Data Analysis with a Semi-Structured Time Series Database", in SLAML, '10, Dated Jul. 31, 2013, 9 pages.

(Continued)

*Primary Examiner* — Michael J Cobb
(74) *Attorney, Agent, or Firm* — Artegis Law Group, LLP

(57) ABSTRACT

A system and method that allows a user to view objects in a three-dimensional environment, where one or more of the objects have a data display (e.g., a data billboard, etc.) that shows data about the object. To enhance user experience and to provide relevant contextual data as the user navigates through the three-dimensional environment, the system calculates a location for the user and a location for each object and determines if a relationship between the user frame of reference and each object location satisfies a first criterion. If the first criterion is satisfied, the system is configured to move the data display to the bottom of a viewing area of the three-dimensional environment (e.g. docking the data display to the bottom of the viewing area, etc.). The system may also arrange the data displays in the same order as the objects are perceived by the user in the three-dimensional environment.

20 Claims, 12 Drawing Sheets

(56) References Cited

U.S. PATENT DOCUMENTS

| | | |
|---|---|---|
| 6,320,586 B1 | 11/2001 | Plattner et al. |
| 6,362,817 B1 | 3/2002 | Powers et al. |
| 6,460,049 B1 | 10/2002 | Becker et al. |
| 6,480,194 B1 | 11/2002 | Sang'udi et al. |
| 6,906,709 B1 | 6/2005 | Larkin et al. |
| 7,379,994 B2 | 5/2008 | Collazo |
| 8,239,130 B1* | 8/2012 | Upstill ............... G01C 21/3679 701/426 |
| 9,047,705 B1 | 6/2015 | Ko |
| 10,380,799 B2 | 8/2019 | Arsan et al. |
| 2004/0090472 A1 | 5/2004 | Risch et al. |
| 2005/0033605 A1 | 2/2005 | Bergeron et al. |
| 2005/0183041 A1 | 8/2005 | Chiu et al. |
| 2006/0044307 A1 | 3/2006 | Song |
| 2007/0094041 A1 | 4/2007 | Coale et al. |
| 2007/0226678 A1 | 9/2007 | Li et al. |
| 2007/0277112 A1 | 11/2007 | Rossler et al. |
| 2008/0070684 A1 | 3/2008 | Haigh-Hutchinson |
| 2008/0244091 A1 | 10/2008 | Moore et al. |
| 2009/0132285 A1 | 5/2009 | Jakobovits |
| 2010/0066559 A1 | 3/2010 | Judelson |
| 2010/0088619 A1 | 4/2010 | Rath et al. |
| 2010/0321391 A1 | 12/2010 | Rubin et al. |
| 2010/0328344 A1 | 12/2010 | Mattila et al. |
| 2011/0169927 A1 | 7/2011 | Mages et al. |
| 2011/0173576 A1* | 7/2011 | Murphy ............... G06F 3/017 715/863 |
| 2011/0179134 A1 | 7/2011 | Mayo et al. |
| 2011/0275409 A1 | 11/2011 | Lee et al. |
| 2011/0279445 A1 | 11/2011 | Murphy et al. |
| 2011/0279446 A1 | 11/2011 | Castro et al. |
| 2011/0279453 A1 | 11/2011 | Murphy et al. |
| 2011/0283223 A1 | 11/2011 | Vaittinen et al. |
| 2012/0050285 A1 | 3/2012 | Kannenberg |
| 2012/0079431 A1 | 3/2012 | Toso |
| 2012/0096403 A1* | 4/2012 | Jung ............... G06F 3/0486 715/817 |
| 2012/0162265 A1 | 6/2012 | Heinrich et al. |
| 2013/0030699 A1 | 1/2013 | Barnes et al. |
| 2013/0110838 A1 | 5/2013 | Lidy et al. |
| 2013/0144916 A1 | 6/2013 | Lum et al. |
| 2014/0002457 A1 | 1/2014 | Swindell et al. |
| 2014/0063058 A1 | 3/2014 | Fialho et al. |
| 2014/0114970 A1 | 4/2014 | Prabu et al. |
| 2015/0002539 A1* | 1/2015 | Li ............... G01C 21/3638 345/629 |
| 2015/0035823 A1 | 2/2015 | Arsan et al. |
| 2016/0240011 A1 | 8/2016 | Fedosov et al. |
| 2017/0213393 A1 | 7/2017 | Fedosov et al. |
| 2021/0264664 A1* | 8/2021 | Saracchini ....... H04N 5/232939 |

OTHER PUBLICATIONS

Hackers, "Hackers Final Showdown", URL : http://www.criticalcommons.org/Members/ironman28/clips/hackers-final-showdown/view, 1995.

Andreas Kneib, Happy Gliding, 2010, retrieved from <<https://nnc3.com/mags/LM10/Magazine/Archieve/2010/114/084-085_tdfsb/article.html>>, accessed Jan. 8, 2017.

Boer et al., "Processing 3D Geo-Information for Augmenting Georeferenced and Oriented Photographs with Text Labels", In A. Ruas & C. Gold (Eds.}, Headway in spatial data handling. Lecture Notes in Geoinformation and Cartography, pp. 351-365, 2008.

* cited by examiner

DOCKABLE BILLBOARDS FOR LABELING OBJECTS IN A DISPLAY HAVING A THREE DIMENSIONAL PERSPECTIVE OF A VIRTUAL OR REAL ENVIRONMENT

PRIORITY CLAIM

This application is a continuation of the U.S. patent application titled, "DOCKABLE BILLBOARDS FOR LABELING OBJECTS IN A DISPLAY HAVING A THREE-DIMENSIONAL PERSPECTIVE OF A VIRTUAL OR REAL ENVIRONMENT," filed on Jul. 18, 2019 and having Ser. No. 16/515,429, which is continuation of the U.S. patent application titled, "DOCKABLE BILLBOARDS FOR LABELING OBJECTS IN A DISPLAY HAVING A THREE-DIMENSIONAL PERSPECTIVE OF A VIRTUAL OR REAL ENVIRONMENT", filed on Apr. 30, 2014 and having Ser. No. 14/266,511, now Pat. No. as 10,380,799, issued Aug. 13, 2019, which claims the priority benefit of U.S. provisional patent application titled, " DOCKABLE BILLBOARDS FOR LABELING OBJECTS IN A THREE-DIMENSIONAL DISPLAY OF A VIRTUAL OR REAL ENVIRONMENT", filed Jul. 31, 2013 and having Ser. No. 61/860,882. The subject matter of these related applications is hereby incorporated herein by reference.

TECHNOLOGY

The present invention relates generally to information systems, and in particular, to extracting and viewing data generated by information systems.

BACKGROUND

Information systems generate vast amounts of information that can be difficult to view and from which it can be difficult to extract useful insight. Although the development of computers and software has been staggering in many ways, existing computer systems are still limited in their capacity to convey large amounts of data in a way that users can digest and understand quickly. Because the amount of relevant data that is available for analysis continues to increase significantly from year to year, the need for improved tools for communicating such data to users is becoming urgent.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
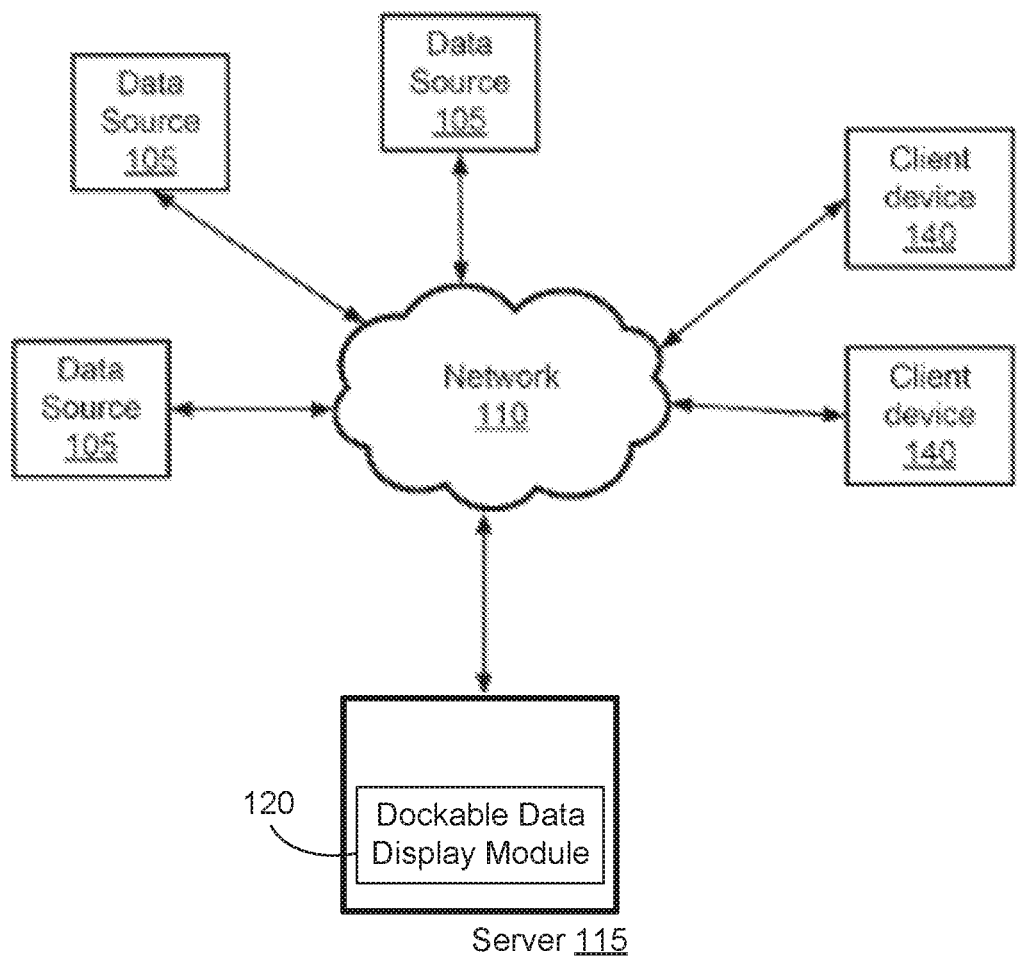
FIG. 1 is block diagram of an example data display system that provides dockable billboards for labeling objects in a three-dimensional display of a virtual or real environment in accordance with an embodiment of the present system.

Example embodiments, which relate to extracting and viewing data, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:
 1. GENERAL OVERVIEW
 2. STRUCTURE OVERVIEW
 3. SECOND EXEMPLARY DATA DISPLAY SYSTEM
 4. EXEMPLARY DATA DISPLAY METHOD
 5. EXEMPLARY USER EXPERIENCES
 6. FIRST EXEMPLARY USER EXPERIENCE
 7. SECOND EXEMPLARY USER EXPERIENCE
 8. EXAMPLE PROCESS FLOW
 9. EXEMPLARY COMPUTER ARCHITECTURE
 10. EQUIVALENTS, EXTENSIONS, ALTERNATIVES AND MISCELLANEOUS 1. General Overview This overview presents a basic description of some aspects of embodiment(s) of the present invention. It should be noted that this overview is not an extensive or exhaustive summary of aspects of the embodiment. Moreover, it should be noted that this overview is not intended to be understood as identifying any particularly significant aspects or elements of the embodiment(s), nor as delineating any scope of the embodiment(s) in particular, nor the invention in general. This overview merely presents some concepts that relate to example embodiments in a condensed and simplified format, and should be understood as merely a conceptual prelude to a more detailed description of example embodiments that follows below.

In various embodiments, a system and method is provided that allows a user to view objects in a three-dimensional environment (e.g., a 3D space, a 3D spatial region, etc.) with a display (e.g., a wearable display, on a two or three-dimensional display, or on any other suitable display, etc.), where one or more of the objects have a data display (e.g., a billboard, etc.) associated with the object that shows data about the object. In various embodiments, the data display contains real-time streaming textual data about the object. To enhance the user experience as the user navigates through the three-dimensional environment, the system calculates a location of the user and a location for at least one object. The system then determines a distance between the user and the at least one object. If the distance between the location of the user and the at least one object is within a predetermined distance, the system may be configured to move the data display for the at least one object to a designated area (e.g., away from the at least one object, etc.) such as the bottom of a viewing area (which may be a part or the entire display area of a display/screen of a computing device) of the three-dimensional environment (e.g., docking the data display at the bottom of the viewing area). When more than one data display is docked at the bottom of the viewing area, the system may be configured to arrange the data displays in the same order as the objects are perceived by or displayed to the user.

In some embodiments, the three-dimensional environment is a computer generated virtual environment. The three-dimensional environment can be viewed by the user on a two-dimensional or three-dimensional display from the perspective of a virtual camera that is positioned in the environment. Thus, a displayed view of the three-dimensional environment shown on the display is determined by the location and the perspective of the virtual camera. As the user navigates through the virtual environment (e.g., moves the location of the virtual camera in the virtual environment, etc.), for example by using a joystick, a controller, a mouse, a keyboard, or any other suitable method of controlling the location and direction of the virtual camera, the data displays may be docked or undocked at the bottom of the viewing area, and/or arranged based on the arrangement of the objects in displayed views of the three-dimensional environment as perceived from the virtual camera. Docking of the data displays may be carried out when the location of an object with respect to the location of the virtual camera satisfies a data display docking criterion (e.g., the distance between the object and virtual camera is less than a threshold distance, the object is located within a predetermined radius from the location of the virtual camera, any other suitable criterion, etc.). Additionally, optionally or alternatively, the data display docking criterion is based at least in part on a function, algorithm, etc., that depends on one or more of (a) a distance of a three-dimensional object relative to the user's location as represented in the three-dimensional environment, and (b) an angle between (1) a first imaginary line connecting a three-dimensional object (e.g., the central location of the three-dimensional object, etc.) and the user's location, and (2) a second imaginary line representing the user's perspective. Additionally, optionally or alternatively, a user or a system can specifically designate/configure a three-dimensional object to have its corresponding data display to be docked in a designated area of a view of the three-dimensional environment; for example, the configurable designation of the three-dimensional object to have its corresponding data display to be docked may be included as a part of the data docking criteria.

In various other embodiments where the three-dimensional environment is a superimposition of (1) a computer-generated three dimensional environment that comprises graphic objects, data displays, etc., and (2) a real-world environment that surrounds the user, the three-dimensional environment may be viewed by the user through a wearable display such as a heads-up display, display glasses, etc., which includes, but is not limited to only, a display attached to a wearable computer that is imaging the real-world environment in real-time as the user moves around. In these embodiments, the system may receive real-time data, non-real-time data, etc., about objects in the surrounding environment and overlay/superimpose at least a portion of the data on the objects viewed by the user or imaged by a camera. For example, if a user is wearing GOOGLE GLASSES®, the user can walk through New York City and view the buildings, shops, and other objects surrounding the user as the user walks down 5th Avenue. Based on position and location information determined by the GOOGLE GLASSES® using various sensors (e.g., GPS, motion sensors, head-tracking sensors, etc.), the system may download information about the various buildings, shops, and landmarks (e.g., objects, etc.) and display the information on data displays (e.g., a billboard, etc.) associated with the object(s) viewed by the user. Thus, as the user navigates down 5th Avenue, the system can move (e.g., dock, etc.) various billboards for objects that satisfy a criterion (e.g., the object is within a threshold distance from the user, etc.) to the bottom of the viewing area (as defined by the heads-up display or display) in the glasses. This allows the user to focus on billboards for objects that are relevant to the position of the user in the user's surrounding environment. In some embodiments, while a user is walking in a real-world environment, a wearable computing device may render 2D and 3D displayed graphic objects (e.g., undocked billboards, markers, shapes, maps, etc.) at specific coordinates (e.g., x-y-z coordinates of a space representing the user's real environment, etc.) of the user's real-world environment, for example, as if the 2D and 3D graphic objects, etc., are a part of the user's real-world environment.

In still other embodiments where the three-dimensional environment is a three-dimensional interactive map (e.g., APPLE® 3D with navigation functionality, etc.) a user may view a map of an area on a handheld device, a tablet or any other display device. As the user navigates through the map, the system may be configured to overlay data billboards on one or more of the objects (e.g., buildings, landmarks, monuments, restaurants, etc.) in the displayed view to provide the user with relevant data associated with the objects. In this way and similar to the embodiments described above, as the virtual camera viewpoint is moved through the 3D map, the user can see information about buildings, landmarks, monuments, retail establishments and any other objects being displayed to the user. Additionally, the data displays for objects within a predefined proximity to the virtual camera location may be docked at the bottom of the display so that relevant information about one or more objects within the predefined proximity can be easily viewed by the user.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Structure Overview

As will be appreciated by one skilled in the relevant field, the present systems and methods may be, for example, embodied as a computer system, a method, or a computer program product. Accordingly, various embodiments may be entirely hardware or a combination of hardware and software. Furthermore, particular embodiments may take the form of a computer program product stored on a computer-readable storage medium having computer-readable instructions (e.g., software, etc.) embodied in the storage medium. Various embodiments may also take the form of internet-based computer software and/or hardware. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems, etc.), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, a special purpose computer, or other programmable data processing apparatus to produce a machine. As such, the instructions which execute on the general purpose computer, special purpose computer, or other programmable data processing apparatus can direct a computer or other programmable data processing apparatus to function in a particular manner such that the instructions stored in the computer-readable memory produce an article of manufacture that is configured for implementing the functions specified in the flowchart block or blocks. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including: a local area network (LAN); a wide area network (WAN); a cellular network; or the connection may be made to an external computer (for example, through the Internet using an Internet Service Provider).

FIG. 1 shows a block diagram illustrating an example data display system for displaying dockable billboards for labeling objects in a three-dimensional display of a virtual or real environment. The system comprises a server (or computing device) 115 that communicates with a plurality of data sources 105 and a plurality of client devices 140 over a network 110 (e.g., the Internet, a cellular network, Wi-Fi, etc.). For the purpose of illustration only, as depicted in FIG. 1, a dockable data display module 120 is included in server 115. However, it should be noted that in various embodiments, one or more dockable data display modules (e.g., 120, etc.) may be located in one or more of clients (e.g., client device 140, etc.), servers (e.g., 115, etc.), etc. For example, a client device (e.g., 140, etc.) can comprise a dockable data display module configured to communicate with a plurality of data sources 105 over network 110.

In various embodiments, the data sources 105 may include any source of data that is relevant to objects in the three-dimensional environment or real-world environment. For example, data source 105 may include computers, routers, databases, operating systems, applications, map data, Internet data or any other source of data. For example, in various embodiments where one or more data sources are computers, each data source 105 may produce one or more different types of machine data (e.g. structured data, unstructured data, unparsed data, server logs, activity logs, configuration files, messages, database records, and the like). In other embodiments where a data source 105 provides map data, one data source may supply 3-dimensional, interactive map data while another data source 105 may supply information about various objects located within the map.

In various embodiments, the server may receive data from data sources 105 over network 110 in real-time, which may be stored in random access memory but not stored locally at server 115. In other embodiments, the server 115 may receive the data from the data sources 105 and store the data locally at server 115, for later use. In these embodiments, the data and three-dimensional environment may be transmitted from server 115 to one or more of the client devices 140 for viewing by a user. In still other embodiments, the data may be transmitted from the server 115 to the client device where it is either immediately viewed or stored locally for later use.

It should be understood that FIG. 1 is an example embodiment of the present system and various other configurations are within the scope of the present disclosure. Additionally, it should be understood that additional devices may be included in the system shown in FIG. 1, or in other embodiments, certain devices may perform the operation of other devices shown in the figure. For purposes of this disclosure, reference to a server, a computer, or processor, shall be interpreted to include: a single server, a single processor or a single computer; multiple servers; multiple processors, or multiple computers; or any combination of servers and processors. Thus, while only a single server is illustrated, the term "computer", "server", and "processor" may also include any collection of computers, servers or processors that individually or jointly execute a set (or multiple sets) of instructions to perform any one or more of the methodologies discussed herein.

3. Second Exemplary Data Display System

Figure 2:
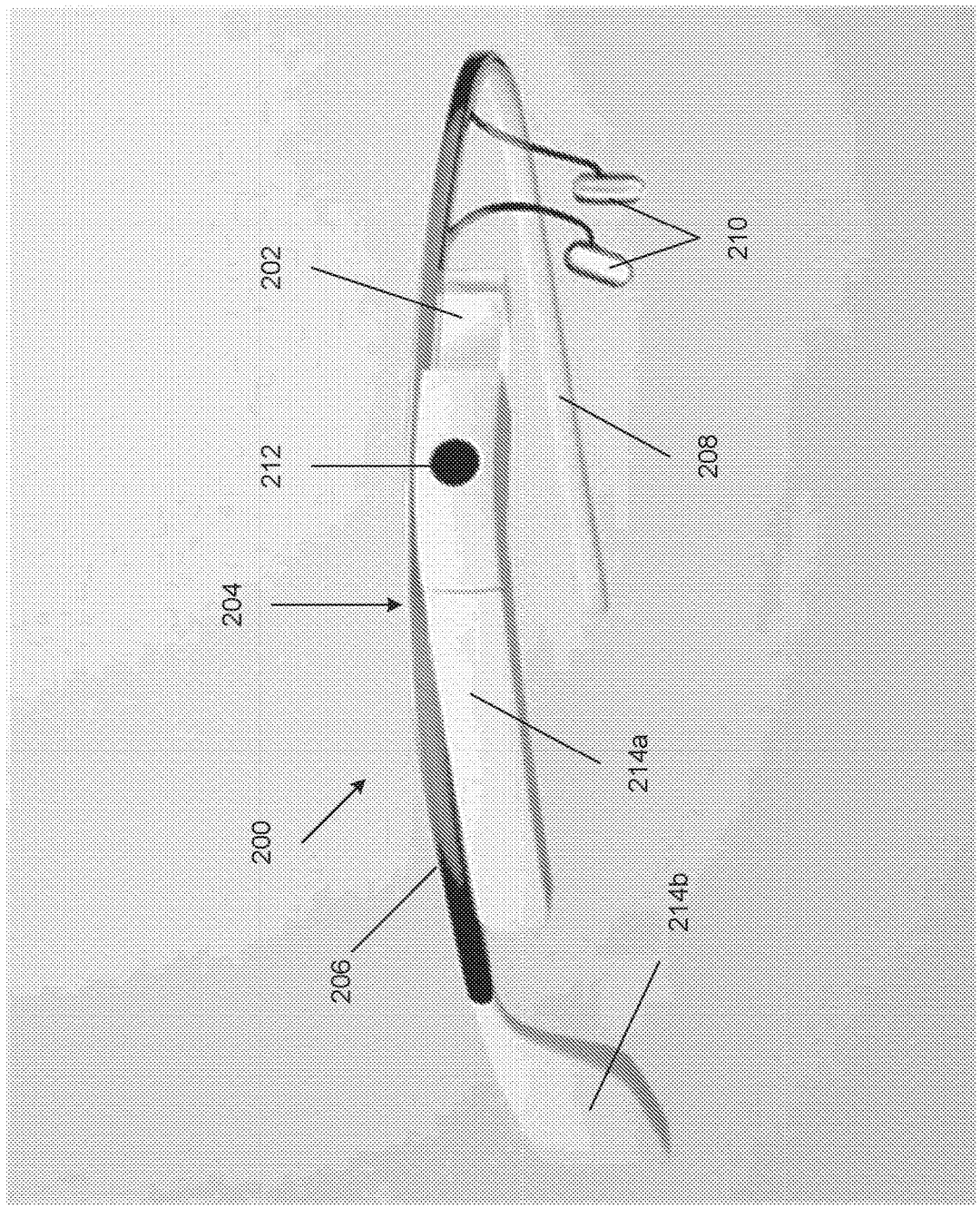
FIG. 2 is a perspective view of an example wearable computer that allows a user to view a real environment in accordance with an embodiment of the present invention.

FIG. 2 shows a perspective view of a wearable computer 200 (e.g., a client device 140 of FIG. 1, etc.) with an optical head mounted display 202 coupled to a frame 204 having first and second temples 206 and 208 and nose supports 210. The wearable computer 200 displays information in a smartphone like, hands-free format that can interact with the Internet and other application via natural language voice commands. The wearable computer 200 has a camera 212 that is capable of taking photos and recording video. The wearable computer may contain various sensors including, but not limited to, gyroscopes, accelerometers, magnetometers, ambient light and proximity sensors, geosynchronous positioning sensors, a geomagnetic field sensor, an orientation sensor and gravity sensors (further described with reference to FIG. 3), etc. The wearable computer may also have one or more of a Wi-Fi transceiver, a Bluetooth transceiver, a cellular transceiver (or a single device that functions as all of these communication devices), storage memory, random access memory, a processor (further described with reference to FIG. 3), etc., which may be contained in one of the housings 214a and 214b. In various embodiments, the wearable computer may contain one or more heads-up displays—instead of or in addition to the optical display 202—that is mounted adjacent to, or unitarily formed with lenses mounted in frame 204. The one or more heads-up displays allow the wearer (or user) to view a scene in the surrounding environment where data, either stored in memory or streamed real-time, to the wearable computer is projected on the one or more heads-up displays so as to align with, superimpose/overlay or be linked to, at least one object viewed by the user.

In various embodiments, the wearable computer 200 may take the form of removable modular housings 214a and 214b that couple to the frame 204. The housings 214a and 214b may be removably secured to a temple (e.g., the temple 206, etc.) of the frame 204. In other embodiments, the wearable computer 200 may be integrally formed with the frame 204. Frame 204 may include a pair of lens openings (not shown) for mounting prescription or non-prescription lenses. In other embodiments as shown in FIG. 2, no lens openings are present. The lens openings may define an optical path for a user wearing the frame 204.

Figure 3:
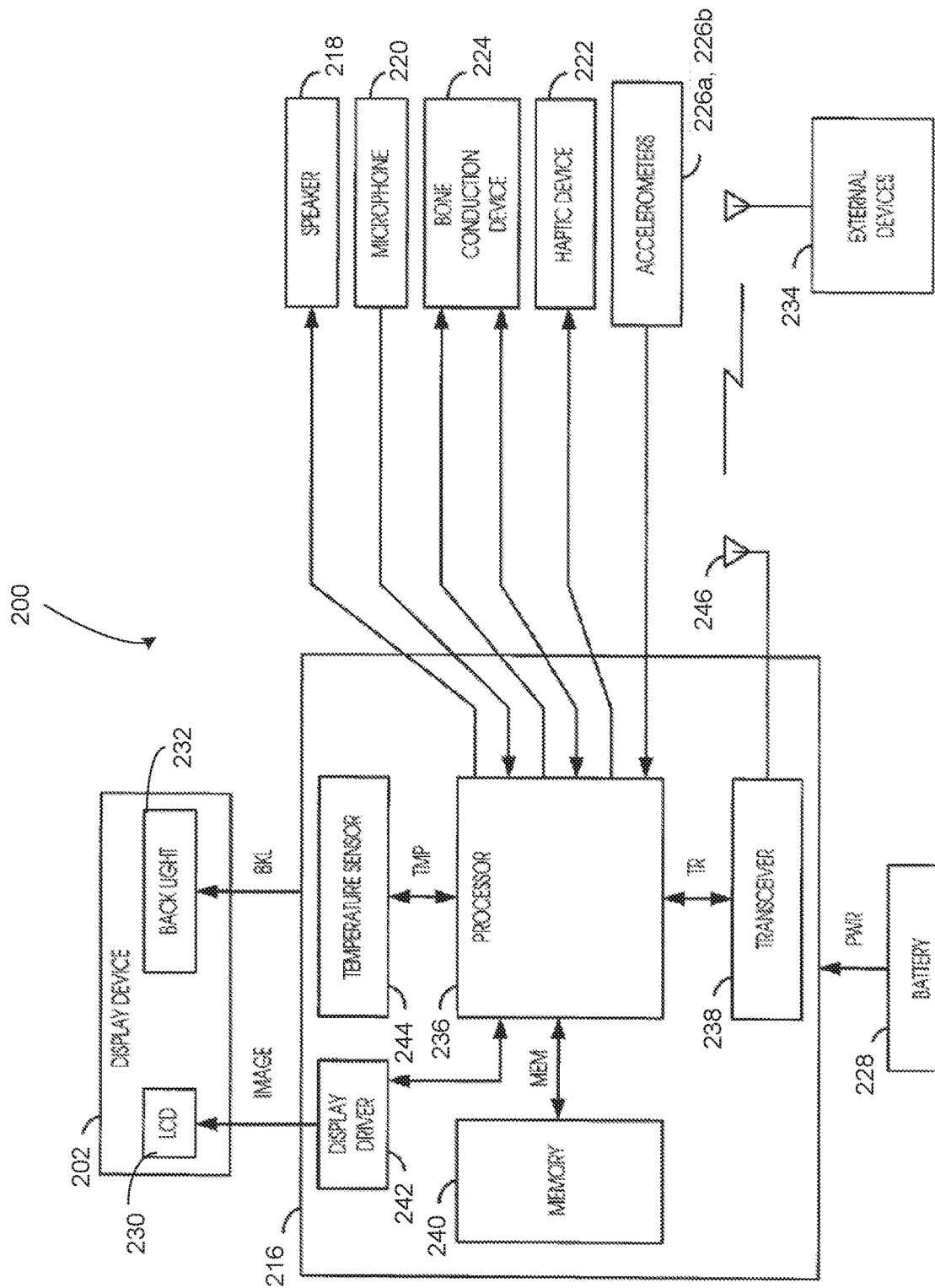
FIG. 3 is a block diagram of the wearable computer shown in FIG. 2.

FIG. 3 is a block diagram illustrating the components of the wearable computer shown in FIG. 2. One of the housings 214a and 214b may contain and/or support a circuit 216, a speaker 218 for providing sound to the user, a microphone 220 for receiving voice commands or speech from the user, a haptic device 222 for providing input to the user, a bone conduction device 224 for providing vibration to the user, and at least two accelerometers 226a-226b that are used by the electronics/RF circuit 216 to receive inputs from the user. Furthermore, one of the housings 214a and 214b may also contain one or more batteries 228 that provide power to the circuit 216. The one or more batteries 228 may be removably or permanently disposed within the one of the housings 214a and 214b.

The circuit 216 comprises a processor 236, a transceiver 238, memory 240, a display driver 242 and a temperature sensor 244. The transceiver 238 may be configured to send and receive cellular signals, Bluetooth signals, Wi-Fi signals and geosynchronous signals via an antenna 246 to the other external devices 234. In various embodiments, applications, modules, data and other information may be stored in the memory 240.

The accelerometer 226a may be oriented to sense a pitch movement of the frame 204 (e.g., a movement of the user's head, etc.) about a pitch (or horizontal) axis. The pitch axis may be defined from left to right through the frame 204. The second accelerometer 226b may be oriented to sense a yaw movement of the frame 204 (e.g., a movement of the user's head, etc.) about a yaw (or vertical) axis. The yaw axis may be defined as a vertical (relative to the ground) axis through the frame 204.

As a result, each of the accelerometers 226a and 226b may be operational to sense and report a direction of acceleration. For example, the pitch accelerometer 228a may generate a positive value in response to a forward rotation (e.g., user's nose moving down, etc.) of the frame 204 about the pitch axis. A negative value may be generated in response to a backwards rotation (e.g., user's nose moving upwards, etc.) of the frame 204 about the pitch axis. Likewise, the yaw accelerometer 226b may generate a positive value for a clockwise rotation of the frame 204 (e.g., user's left ear forward, right ear backwards, etc.) about the yaw axis. A negative value may be generated for a counterclockwise rotation of the frame (e.g., user's left ear backwards, right ear forward, etc.) about the yaw axis. Thus, an output signal from the pitch accelerometer 226a may be used to answer a telephone call in response to the accelerometer 226a detecting a nodding "yes" (pitch) movement of the user's head. A shaking "no" (yaw) movement of the user's head may cause the second accelerometer 226b to send a different command to circuit 216 to not answer the call.

The circuit 216 may be configured to provide two-way radio communications with other external devices 234 (e.g., other phones, computers, etc.). For example the electronics/RF circuit 216 may receive telephone calls or display data on LCD 230 of display 202. Display 202 includes LCD 230 and backlight 232. The commands provided to the wearable computer 200 may be generated in a hands-free manner (e.g., without a user pressing a button with his or her hands, etc.). The communications may be implemented using a wireless Bluetooth standard, a wireless Universal Serial Bus (USB) standard, a cellular telephone standard, a Wi-Fi standard, etc. Other standard and/or propriety protocols may be implemented to meet the criteria of a particular application.

4. Exemplary Data Display Method

Figure 4:
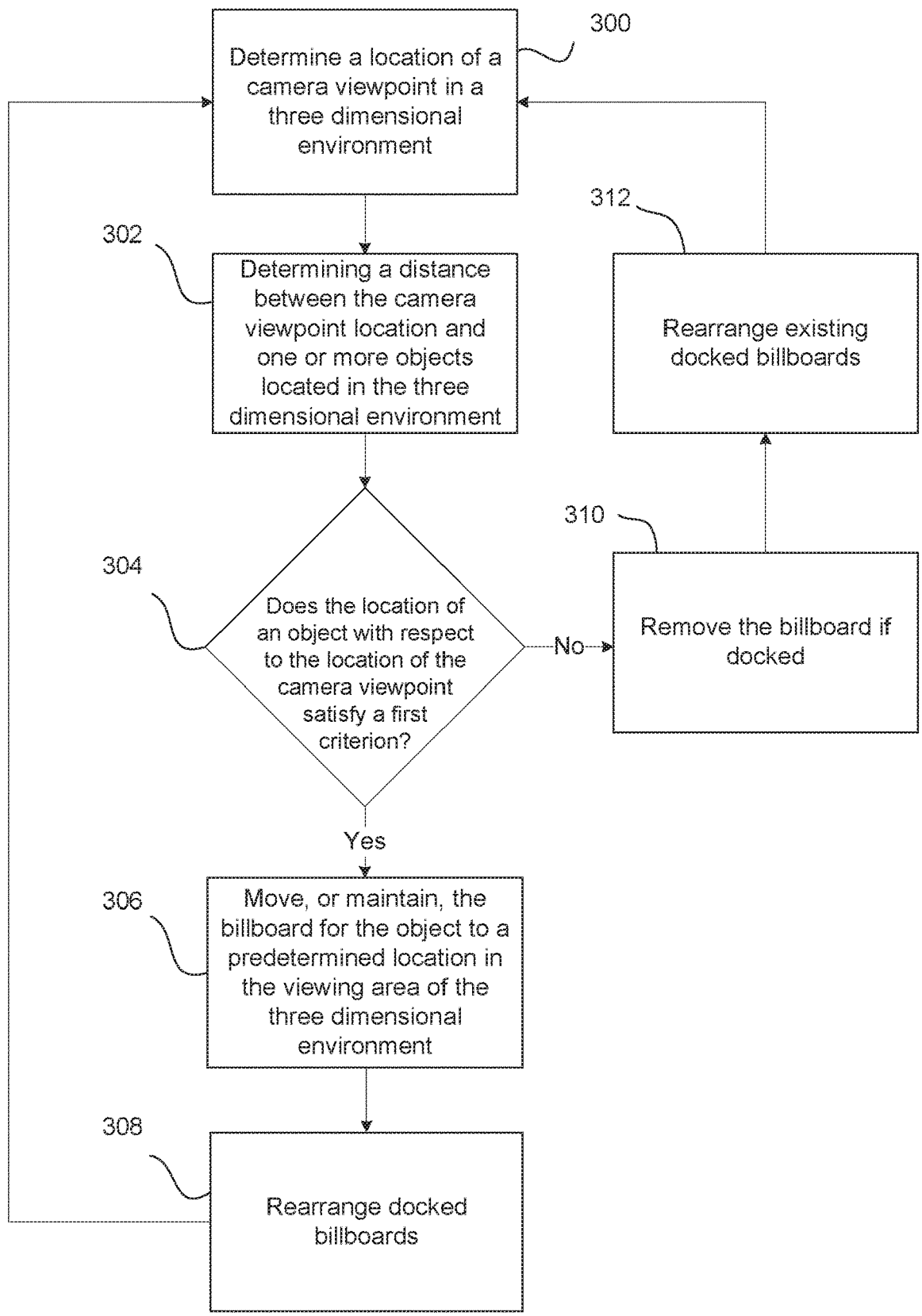
FIG. 4 comprises a flow diagram illustrating an example process performed by the system of FIG. 1 or the system of FIG. 3 in accordance with an embodiment of the present method.

The system of FIG. 1 or the wearable computer of FIG. 2 may be configured to perform the method steps of FIG. 4. Moreover, the method described in FIG. 4 is an example of an embodiment of present methods for displaying dockable billboards for labeling objects in a three-dimensional display of a virtual or real environment. It should be understood by reference to this disclosure that the method describes an example embodiment of the methods steps carried out by the present system, and that other example embodiments may be created by adding other steps or by removing one or more of the method steps described in FIG. 4.

FIG. 4 depicts an example method for displaying dockable billboards for labeling objects in a two-dimensional or three-dimensional display of a (e.g., a navigable, etc.) virtual and/or real three-dimensional environment. The method begins at step 300 when the system determines a location and a camera viewpoint of a virtual camera positioned in the three-dimensional environment. In various embodiments, the camera viewpoint of the virtual camera may represent a perspective of a user represented at the location in the three-dimensional environment, and the location of the virtual camera may be the same as the user's location as the user is being represented in the three-dimensional environment. In some embodiments, the location and camera viewpoint of the virtual camera can be determined by the physical location and orientation as detected by one or more sensors (e.g., motion sensors, location sensors, orientation detection sensors, accelerometers, magnetic sensors, GPS sensors, etc.) worn by a user as the user navigates around the user's environment. For example, in various embodiments having a wearable computer attached to the user's head (e.g., via spectacle frames, etc.), a scene captured by the wearable computer may be displayed on a display coupled to the wearable computer so that the user can view a scene of the surrounding environment with data billboards linked to, or overlaid on, at least one of the objects being viewed in the environment. Thus, in this example, the position, location, orientation, motion, etc., of the wearable computer, as determined by various sensors attached to the wearable computer, may be used to obtain data associated with the viewed objects. Continuing with this example, the data associated with the objects may be, but is not limited only to, real-time streaming data (e.g., data obtained over a cellular data connection, a Wi-Fi connection or a Bluetooth connection, etc.) or the data may be stored in memory that is part of the wearable computer.

At step 302, the system 100 or system 200 may be configured to determine a distance between the camera (virtual camera) location and at least one object located in the environment. In various embodiments, the virtual camera location and the location of at least one object may be calculated based on a common coordinate system (e.g., Cartesian, polar, etc.) for the virtual environment. In other embodiments that use a wearable computer, the location of the virtual camera may be determined using geosynchronous information that is received by the wearable computer, and the location of each object in the three-dimensional environment may be calculated with respect to the location of the wearable computer based on a known longitudinal and latitudinal position of each object.

At step 304, the system 100 or wearable computer 200 determines whether a location for the object with respect to the location of the camera (virtual camera) viewpoint satisfies a first criterion (e.g., a data display docking criterion, etc.). In various embodiments, the first criterion may be the proximity of the object to the location of the virtual camera (e.g., the location of the user as represented in the three-dimensional environment, etc.), where the first criterion is satisfied by a set number of objects that are closest to the location of the virtual camera. In other embodiments, the first criterion may be a threshold distance, where the first criterion is satisfied when the distance between the location of an object (e.g., all-around, in front of the virtual camera, etc.) and the location of the camera itself is within the threshold distance. In still other embodiments, the first criterion may be a predefined radius around the location of the camera (virtual camera), where the first criterion is satisfied if an object location is within the predefined radius. It should be understood in light of this disclosure that there are many ways to determine the distance between an object in a three-dimensional environment and a camera (virtual camera) represented in the three-dimensional environment, and all such methods are contemplated by the present disclosure.

If an object location, with respect to the location of the camera (virtual camera) satisfies the first criterion, at step 306, the system 100 or wearable computer 200 moves a data billboard for the object to a predetermined location in (or a designated portion of) a viewing area (which may be a part or the entire display area of a display/screen of a computing device) of the three-dimensional environment. The predetermined location may be any location where one or more data displays may be grouped for the objects that satisfy the first criterion. In various embodiments, the predetermined location of the viewing area may be away from the object to which the billboard corresponds, proximate to a specific designated location, or in a designated area such as an area along a bottom edge, a left edge, top edge, right edge, etc., of the viewing area. In one or more embodiments, the predetermined location may be top or side edge of the viewing area.

It should be understood from reference to this disclosure that in various embodiments, the viewing area corresponds to a scene (e.g., a displayed view, etc.) of the three-dimensional environment that would be captured from a viewpoint positioned at the location and the perspective of the virtual camera. If a data billboard for an object is already located at the predetermined location in the viewing area, in various embodiments, the system maintains the position of the data billboard at the predetermined location (e.g., keeps the billboard docked at the bottom of the viewing area, etc.). In various embodiments, when the data billboard is moved to the predetermined location, it may be linked to its corresponding object using a lead line (e.g. a solid or dotted line, etc.). In some embodiments, solid lines may be used to link a billboard to an object that can be seen from the camera viewpoint and dotted lines may be used to link billboards to objects that are located behind another object and not in the line of sight, in displayed views of the three-dimensional environment as perceived from the camera viewpoint. In still other embodiments, the data billboard may be colored to match a color of its corresponding object. In still other embodiments, the object may be marked with a marker (e.g., a shaped marker, an encircled number, etc.) and the data billboard may contain or be associated with a corresponding marker thereby allowing the user to link each docked data billboard with its corresponding object.

In embodiments using a wearable computer having a camera, the viewing area (the displayed view as rendered on the display with the user) of the three-dimensional environment is a scene that is captured by the camera. In still other embodiments that use a heads-up display (e.g., a transparent display associated with a wearable computer, etc.), the viewing area (the displayed view as rendered on the display with the user) of the three-dimensional environment corresponds to that portion of the real-world environment that may be viewed by the user through the heads-up display or through the transparent display. In these embodiments, moving the data billboard to a designated area of the viewing area such as a bottom edge, etc., of the viewing area further comprises moving the data billboards for those objects that satisfy the first criterion to a bottom edge of the heads-up display, the bottom edge of the transparent display or a bottom edge of a two-dimensional display that displays the viewing area of the three-dimensional environment (which may overlaid or superimposed with a portion of the real-world three-dimensional environment in some embodiments).

In various embodiments, each data billboard is arranged in the designated area so that the data billboards do not overlap with one another. This allows the user to read the content of each of the data billboards. In some of these embodiments, the data displays (e.g., billboards docked or moved into the predetermined location, the designated area, etc.) may be presented in the same order as the order of the objects—from which the data displays were moved into their docked position in the predetermined location, the designated area, etc.—in displayed views of the three-dimensional environment as perceived from the location and the perspective of the camera (virtual camera), for example, about the yaw angle (e.g., horizontally, etc.). In still other embodiments, at step 308, as the perspective of the camera pans (e.g., the yaw angle changes, etc.) across the three-dimensional environment, the data billboards for objects that satisfy the first criterion are dynamically rearranged based on lateral changes in the relative positions of the objects in displayed views of the three-dimensional environment, as perceived by the camera (virtual camera), etc. The method then restarts at step 300.

If, on the other hand, a location of an object with respect to the location of the camera (virtual camera) viewpoint fails to satisfy the first criterion, at step 310, the system 100 or the wearable computer 200 removes the data display if docked at the particular location in the viewing area back to the object, or if the data billboard was not docked, the system maintains the data billboard near or on its corresponding object. At step 312 the system may rearrange the existing docked billboards in accordance with at least a second criterion. The second criterion can, but is not limited to, a docked display ordering criterion that orders lateral positions of data billboards in the same order as the order of objects to which the data bill boards correspond in displayed views of the three dimensional environment as perceived from the location and the perspective of the virtual camera. Once the docked data billboards are rearranged, the method then restarts at step 300.

In various embodiments, in response to receiving (e.g., user, system, etc.) input specifying that the camera (virtual camera) changes from a first location to a second location and/or from a first perspective to a second perspective, the system dynamically moves each data billboard from the predetermined location in the predetermined location, designated area, etc. of the viewing area (e.g., undocks the billboard, etc.) back to an undocked position (e.g., overlaid on an object or adjacent the object to which the data billboard corresponds, etc.) once the object corresponding to the data billboard fails to satisfy the first criterion. Furthermore, the system dynamically moves each billboard for its corresponding object from a position on, or adjacent to, the object to the predetermined location, designated area, etc., in the viewing area (e.g., docks a data display, etc.) once the object corresponding to the billboard satisfies the first criterion. Moreover, in various embodiments, the system may be configured to rearrange the docked billboards as the camera (virtual camera) viewpoint moves from the first location to the second location based on at least a second criterion. In some embodiments, the second criterion may be the relative location of each object with respect to the other objects in displayed views of the three-dimensional environment as perceived from the camera (virtual camera).

5. Example User Experiences

The operation of example embodiments of the present system and methods are perhaps best understood by reviewing particular examples. The following examples describe the experience of the user while using the data display system of FIG. 1 or the wearable computer of FIG. 2. In the examples described herein, the three-dimensional environment is shown on a two-dimensional display that is viewed by the user. However, it should be understood from reference to this disclosure that when using the wearable computer, the real-world environment may be viewed by the user through a heads-up display that overlays the billboards associated with objects onto the viewed scene in a manner that links each billboard to its corresponding object. Thus, in embodiments that use a heads-up display, the term heads-up display should be understood to include instances where the data billboards are projected onto the lenses of glasses, or the lenses of the glasses are configured to operate as a transparent display so that the billboards are overlaid onto the scene being viewed by the user through the transparent display. Additionally, the data billboards may be directly projected onto the retinas of the user so that the billboards are perceived by the user as being projected into the environment.

6. First Example Experience

Figure 5:
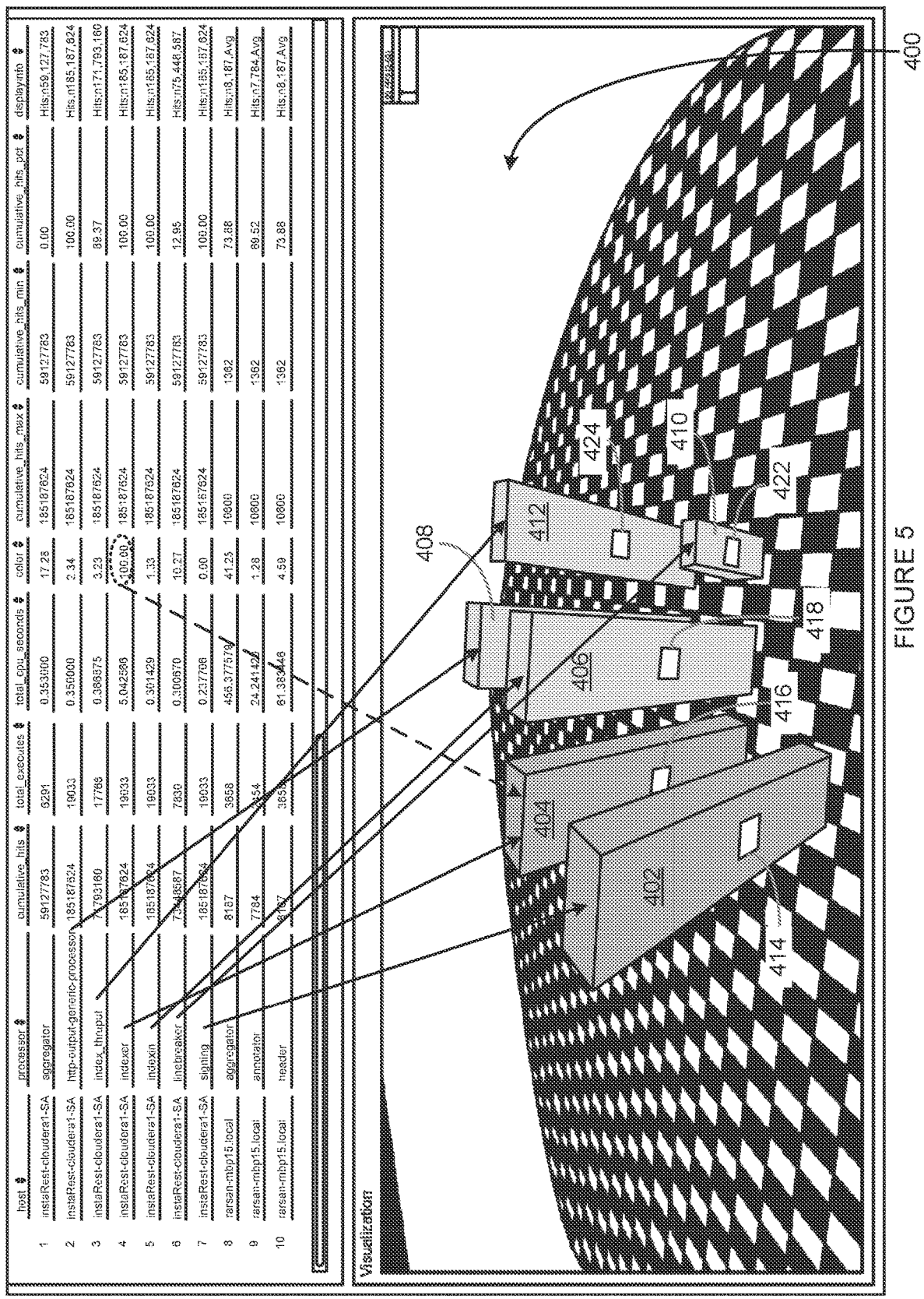
FIG. 5 through FIG. 8 illustrate an example view of a three-dimensional environment as perceived from a virtual camera located within the virtual environment created by the system of FIG. 1 in accordance with one embodiment of the present system and methods.
Figure 6:
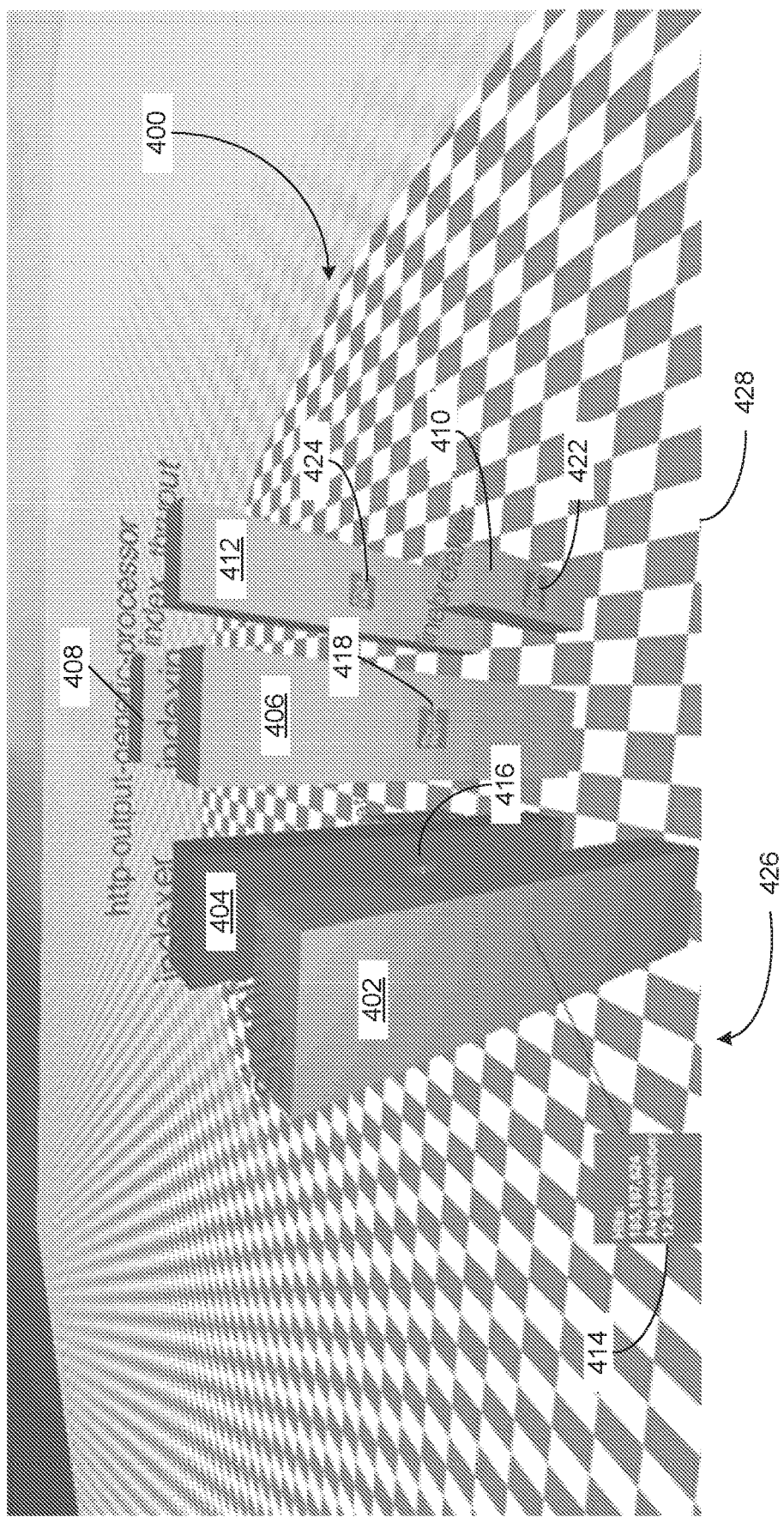

Referring to FIG. 5 through FIG. 8, a three-dimensional environment is shown having one or more objects 402-412 located therein. Referring particularly to FIG. 5, at least one of the objects has a data display (e.g., data billboard, etc.) 414, 416, 418, 422, and 424 located on its corresponding object. In the example shown, each object corresponds to a processor in a multi-processor environment (e.g., a server farm, etc.). Thus, the dimensions of the object correspond to a facet of data associated with the processor. In various embodiments, the data displays 414, 416, 418, 422, and 424 display real-time textual data associated with the corresponding object (e.g., processor, etc.). Referring to FIG. 6, as the camera (e.g., virtual camera, a user represented by the three-dimensional environment, etc.) moves from an initial location and an initial perspective corresponding to the displayed view shown in FIG. 5 to a first location and a first perspective corresponding to the displayed view shown in FIG. 6, the object 402 moves within a particular proximity (e.g., satisfying a first criterion as previously discussed, etc.) with respect to the camera causing the data billboard to move (e.g., dock, etc.) to the predetermined location 426 (e.g., a designated area, etc.) in a viewing area 428 (e.g., a displayed view, etc.) of the virtual environment 400. That is, the viewing area 428 is that portion of the scene of the (e.g., virtual, etc.) three-dimensional environment 400 that is perceived by a virtual camera with the first location and the first perspective in the (e.g., virtual, etc.) three-dimensional environment. In some embodiments, a data display (or a data display area thereof) that corresponds to (e.g., associated with, etc.) a three-dimensional object displays the same content when the data display is undocked (e.g., located at a position aligned with the position of the three-dimensional object in displayed views of the three-dimensional environment, etc.) and when the data display is docked in a predetermined location (e.g., a designated area not aligned with the position of the three-dimensional object, etc.). A data display as described herein can be used to display textual data as well as non-textual data. For example, a data display may be used to display graphic data, map data, topological data, topographic data, actionable controls (e.g., a user selectable control to perform an operation or an action, etc.), etc. In some embodiments, a data display is interactive in that a user can perform user interaction, perform user input, etc., with respect to the data display or displayed components therein. For example, a user may be presented with high-level depiction of a building, a system, etc., initially in a data display; the user can select an object portrayed in the high-level depiction to find detailed information, detailed sub-components, etc., in a component represented by the selected object.

Figure 7:
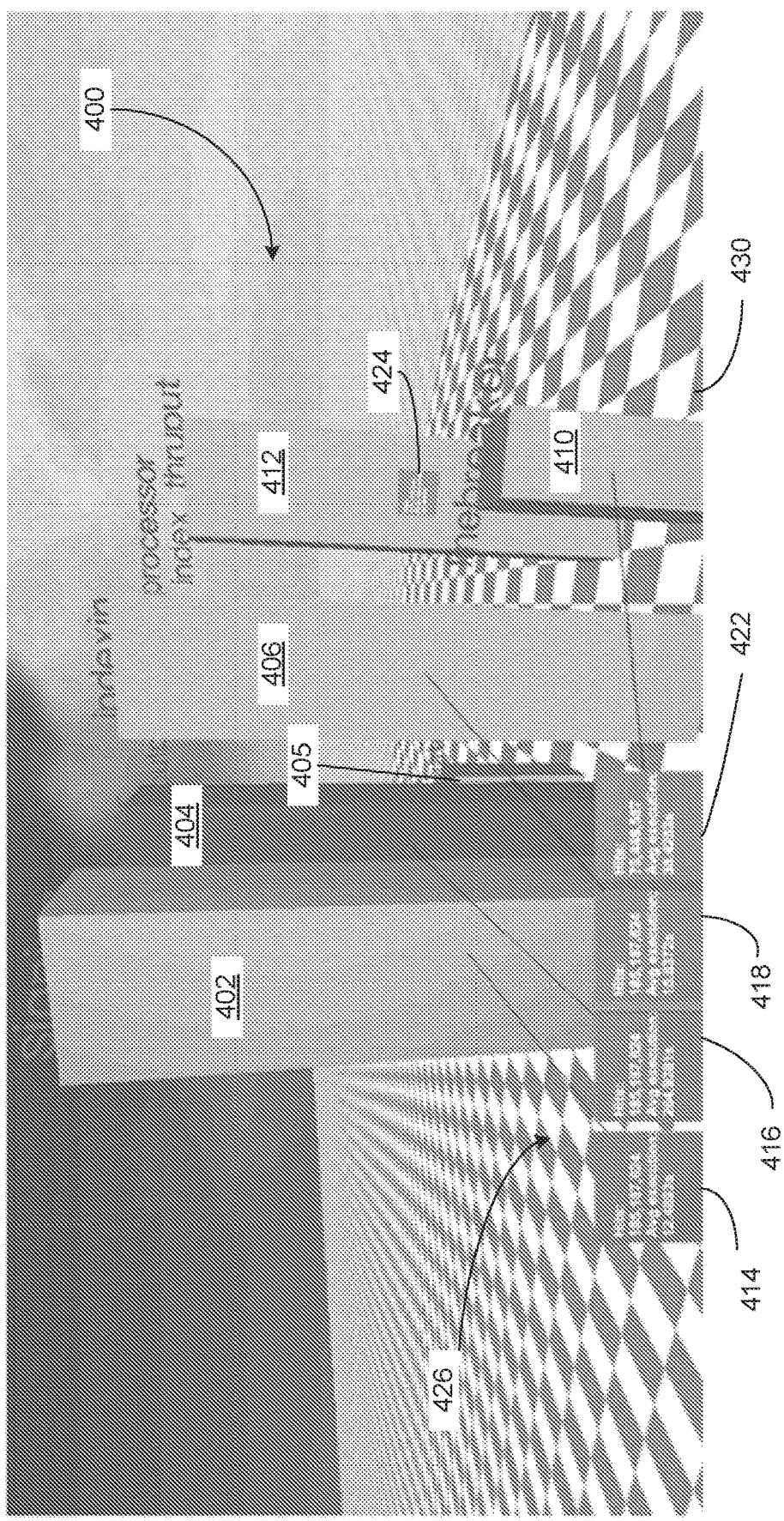

Referring to FIG. 7, when the camera viewpoint moves from the first location and the first perspective to a second location and a second perspective in the three-dimensional environment, the viewing area 430 of the three-dimensional environment, as perceived from the camera at the second location with the second perspective, changes as illustrated in the figure. As such, object 402 remains within the particular proximity (e.g., satisfying a first criterion as previously discussed, etc.) with respect to the camera at the second location with the second perspective (e.g., the billboard 414 remains docked, etc.) but other objects 404, 405, 406 and 410 move within the particular proximity with respect to the camera at the second location with the second perspective. Thus, the billboards 416, 418 and 422 dock in the predetermined location 426 (e.g., the designated area, etc.) in non-overlapping positions. In some embodiments, the billboards 416, 418 and 422 as docked are arranged in the same order as the order of lateral positions of the objects to which the billboards 416, 418 and 422 respectively correspond in the (e.g., currently, etc.) displayed view of the three-dimensional environment (or the viewing area), as perceived from the camera at the second location with the second perspective. Because object 412 remains outside the particular proximity (e.g., not satisfying the first criterion, etc.) with respect to the camera at the second location with the second perspective, billboard 424, corresponding to object 412, remains undocked and positioned on the object 412.

Figure 8:
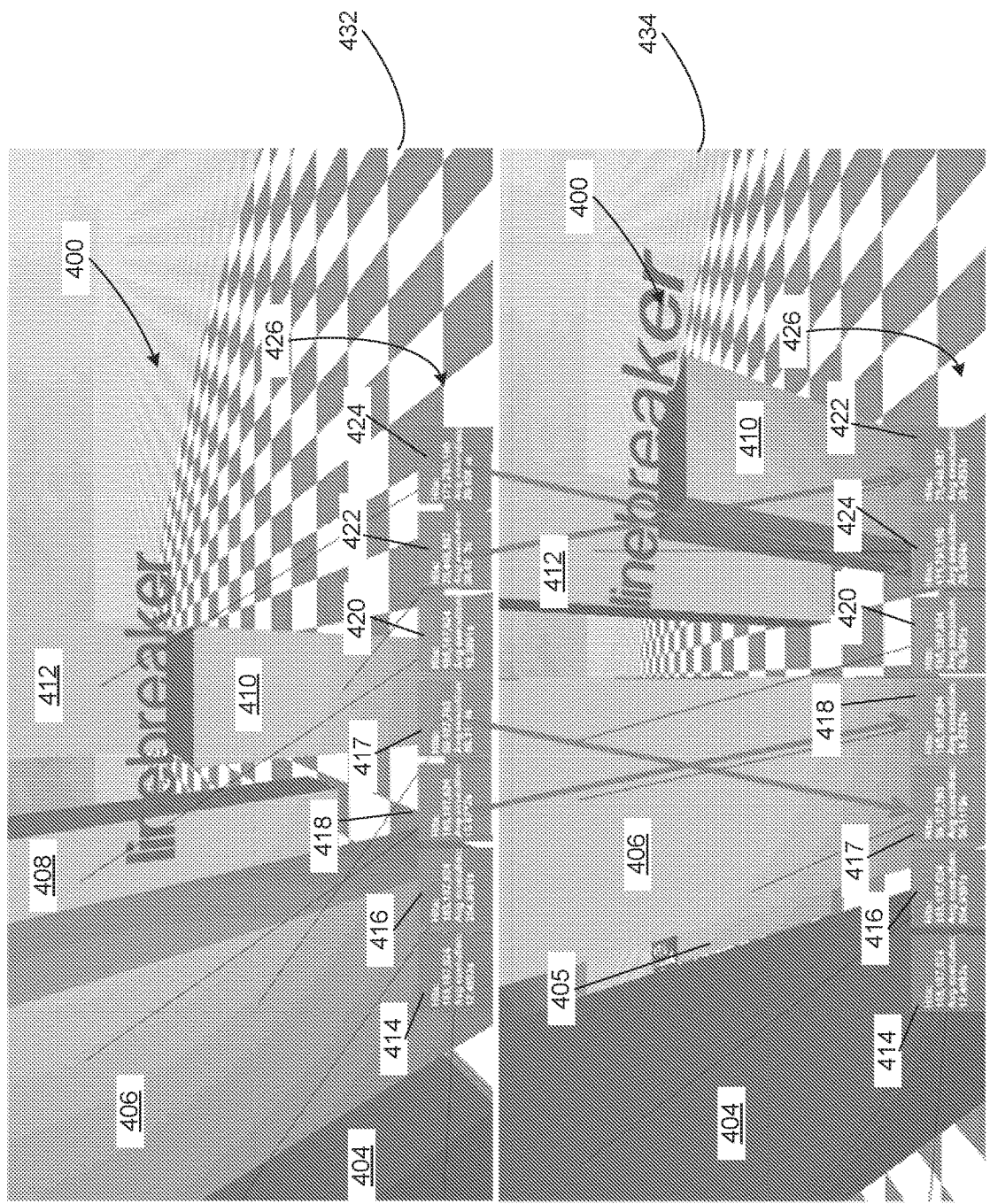

Referring to the upper viewing area 432 in FIG. 8, as perceived from the camera (or virtual camera) at a third location with a third perspective, multiple billboards 412, 414, 416, 418, 420, 422, and 424 are docked at the predetermined location 426 (e.g., in the designated area, etc.) in viewing area 432. That is, with respect to the third location and the third perspective, each of the objects 402, 405, 406, 408, 410 and 412 are located at a distance within the particular proximity from the camera at the third location with the third perspective such that each corresponding billboard 414, 416, 418, 47, 420, 422 and 424 is docked at the predetermined location 426 (e.g., in the designated area, etc.) of the viewing area 432. Moreover, each docked billboard is arranged according to the relative lateral position of its corresponding object with respect to the other objects, as perceived from the camera at the third location with the third perspective.

Referring to the lower viewing area 434, as perceived from the camera (or virtual camera) when the camera is moved to a fourth location and a fourth perspective, all of the same objects shown in the upper viewing area 432 are still within the particular proximity to the camera at the fourth location with the fourth perspective. Thus, all of the docked billboards remain docked. However, in the viewing area 434 as perceived from the camera at the fourth location with the fourth perspective, the lateral position of each object has changed with respect to the other objects. As a result, billboards 417 and 418 are dynamically reordered, and billboards 422 and 424 are dynamically reordered as the camera moved from the third location and the third perspective to the fourth location and the fourth perspective.

In all of the viewing areas shown in FIG. 5 through FIG. 8, the data presented on the billboards may be real-time textual data, non-real-time textual data, etc., associated with a processor that corresponds to the object associated with the respective billboard.

7. Second Example User Experience

Figure 9:
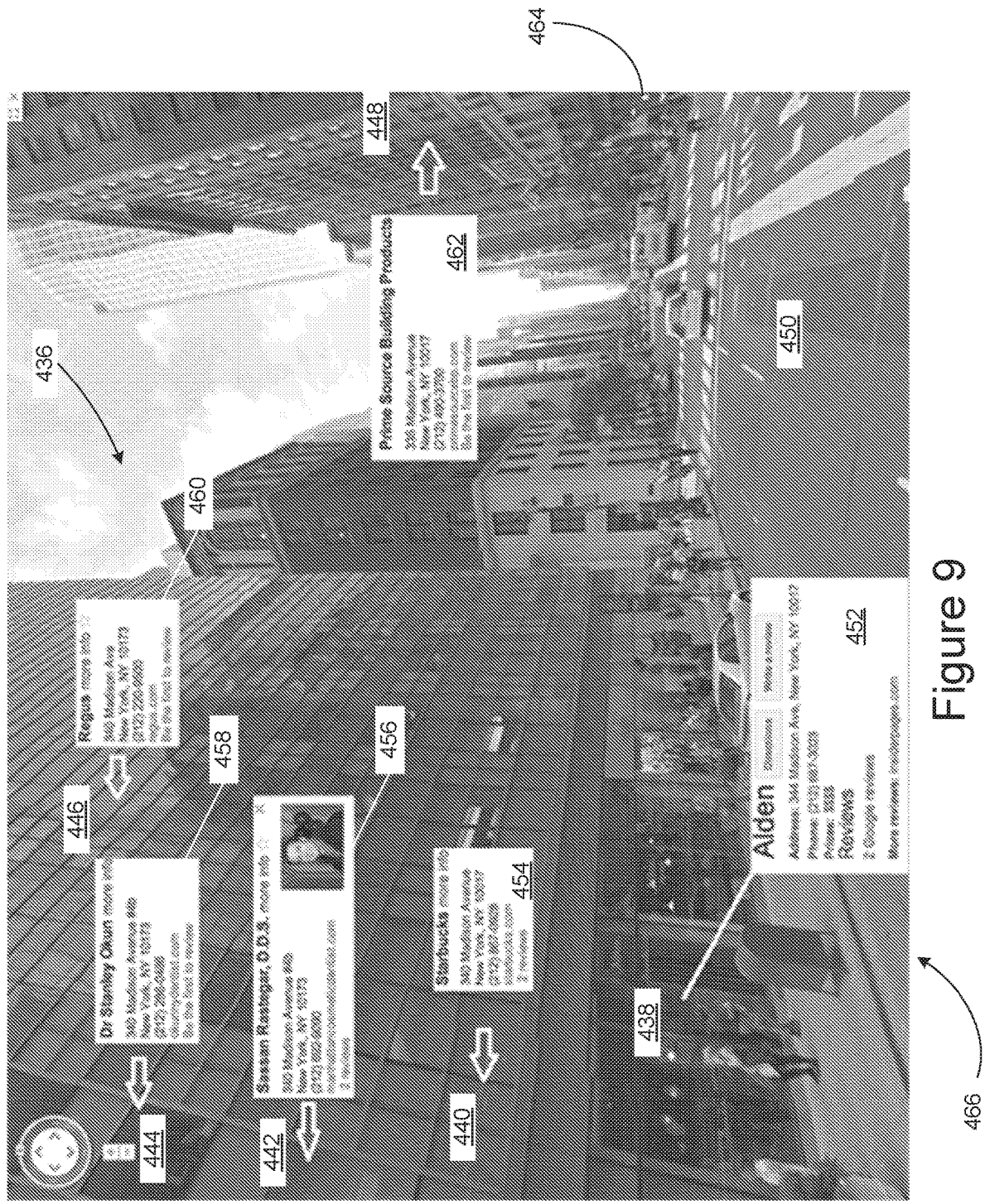
FIG. 9 and FIG. 10 illustrate an example view of a real environment as perceived by a camera located in the real environment in accordance with an embodiment of the present systems and methods.
Figure 10:
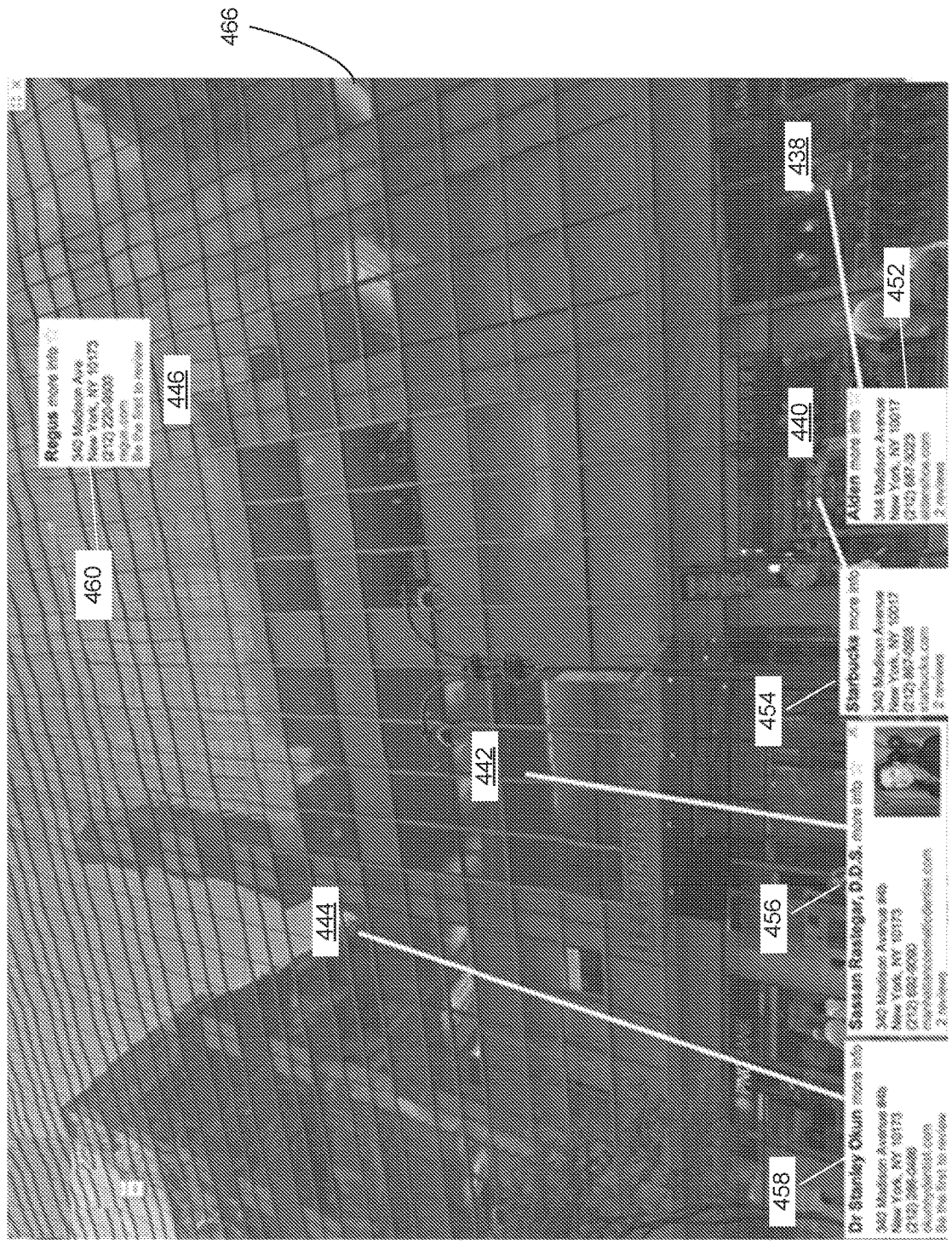

FIG. 9 and FIG. 10 illustrate a three-dimensional environment 436 having one or more objects 438-448 located therein. In the particular embodiment shown in FIG. 9 and FIG. 10, the three-dimensional environment is being viewed using a wearable computer or directly by the user through a heads-up display. In some embodiments, the user may be wearing a computer coupled to a camera where images captured by the camera of the real-world environment surrounding the user are viewed on a two-dimensional display. In some embodiments, the user may be viewing the real-world environment surrounding the user through a transparent heads-up display or transparent display where billboards containing data associated with the objects being viewed are overlaid or linked to the objects. For example, the real-world environment may be a town or city (e.g., New York City, etc.) and the objects in the user's view may be a retail store (e.g., a coffee shop, a building supply store, etc.), a service provider (e.g., a doctor, a dentist, etc.), etc., that may be located in one or more buildings. The objects being viewed in the real-world environment may also be a landmark (e.g., the Empire State building, a museum, a monument, etc.).

Referring particularly to FIG. 9, a user (with which a camera or virtual camera is collocated and shares the same location and perspective) is standing on 5th avenue 450 in New York City wearing the wearable computer of FIG. 2. At least one object has an associated data billboard 452, 454, 456, 458, 460, or 462 located proximate a corresponding object. Each of the data billboards may be linked to a respective object of the objects via a line or other suitable indicator such as an arrow, as shown in the figure. In various embodiments, linking a billboard to its corresponding object may also be carried out by, for example, color coding the billboard and its corresponding object (e.g., with the same color, with the same brightness, with the same texture, etc.).

In the embodiment of FIG. 9, the viewing area 464 is displayed on a display such as 202 of FIG. 3, etc., of a computing device such as the wearable computer 200, etc. In other embodiments, the viewing area 464 may also be the scene actually viewed by the user's eyes through a heads-up display (not shown) or through a transparent display (e.g., in the shape of lenses contained in a glass frame (not shown), etc.) where the billboards 452, 454, 456, 458, 460, and 462 are overlaid on the viewing area based on location information computed by the wearable computer 200 using data (e.g., GPS data, magnetic compass signals, etc.) obtained from one or more of the sensors that are part of the wearable computer device 200.

In various embodiments, the billboards 452, 454, 456, 458, 460, and 462 contain data (e.g., textual, hyperlinks, pictures, etc.) associated with the corresponding object (e.g., business establishment, etc.). Based on a camera viewpoint location shown in FIG. 9, the retail establishment represented by object 438 satisfies at least one criterion (e.g., is within a certain proximity to the location of the camera viewpoint, etc.). As a result, the billboard 452 is moved to a predefined location 466 (e.g., a designated area, etc.) in the viewing area 464. In some embodiments, the predefined location 466 is positioned proximate the bottom edge of the viewing area 464. In other embodiments, the viewing area need not be predefined and the system may dynamically choose the area that the billboards are docked based on what is being viewed (e.g., by choosing an area that is least obstructive to the user's view, etc.).

In various embodiments, the at least one criterion may be defined as a preset number (e.g., five, etc.) of objects that are closest to the location of the camera viewpoint. In other embodiments, the at least one criterion may be satisfied by any object whose distance from the camera viewpoint location is less than a threshold distance. In still other embodiments, the at least one criterion may be satisfied when an object is located within a defined radius from the location of the camera viewpoint.

Referring to FIG. 10, as the camera (e.g., with the location and the perspective of the user, etc.) moves from a first location and a first perspective (e.g., corresponding to the user's location and perspective in FIG. 9, etc.) to a second location and a second perspective (e.g., corresponding to the user's location and perspective in FIG. 10, etc.), the objects 438, 440, 442, 444 and 446 move with respect to one another, as perceived from the camera in the second position with the second perspective. Thus, when the camera is at the second location with the second perspective, the distances between the location of the camera and the location of objects 438, 440, 442, and 444 satisfy the first criterion, thereby resulting in the billboards that corresponds to these objects being docked at the bottom of the viewing area 466 in an order from left to right that corresponds to the order of the objects from left to right, as perceived from the camera at the second location with the second perspective.

In some embodiments, the same three-dimensional environment as described herein can be explored by multiple users represented at the same or even different locations in the three-dimensional environment. For example, the three-dimensional environment may be an environment that represents a first user in Chicago and a second user in San Francisco.

The first user and the second user can have their respective perspectives at their respective locations. The first user and the second user can have their own displayed views of the same three-dimensional environment on their own computing devices. At their choosing, the first user and the second user can explore a portion of the three-dimensional environment in a collaborative or non-collaborative manner; exchange their locations or perspectives; exchange messages/information/history with each other; etc.

A history of a user's location and/or the user's perspective as generated by the user's exploration (e.g., via the control of a virtual camera representing the user's location and perspective, etc.) in a three-dimensional environment as described herein may constitute a trajectory comprising one or more time points and one or more of user-specified waypoints, system-generated waypoints, user-specified continuous spatial segments, system-generated continuous spatial segments, as traversed by the user in the three-dimensional environment at the respective time points. The trajectory of the user in the three-dimensional environment can be recorded, replayed (or played back), paused, rewound, fast-forwarded, altered, etc.

A history of underlying data that supports a user's exploration (e.g., via the control of a virtual camera representing the user's location and perspective, etc.) in a three-dimensional environment as described herein may be recorded by a system as described herein. Instead of playing back the user's own history of exploration, the underlying data that supports the user's particular exploration can be explored or re-explored with same or different locations and/or perspectives as compared with those of the user's own history of exploration.

8. Example Process Flow

Figure 12:
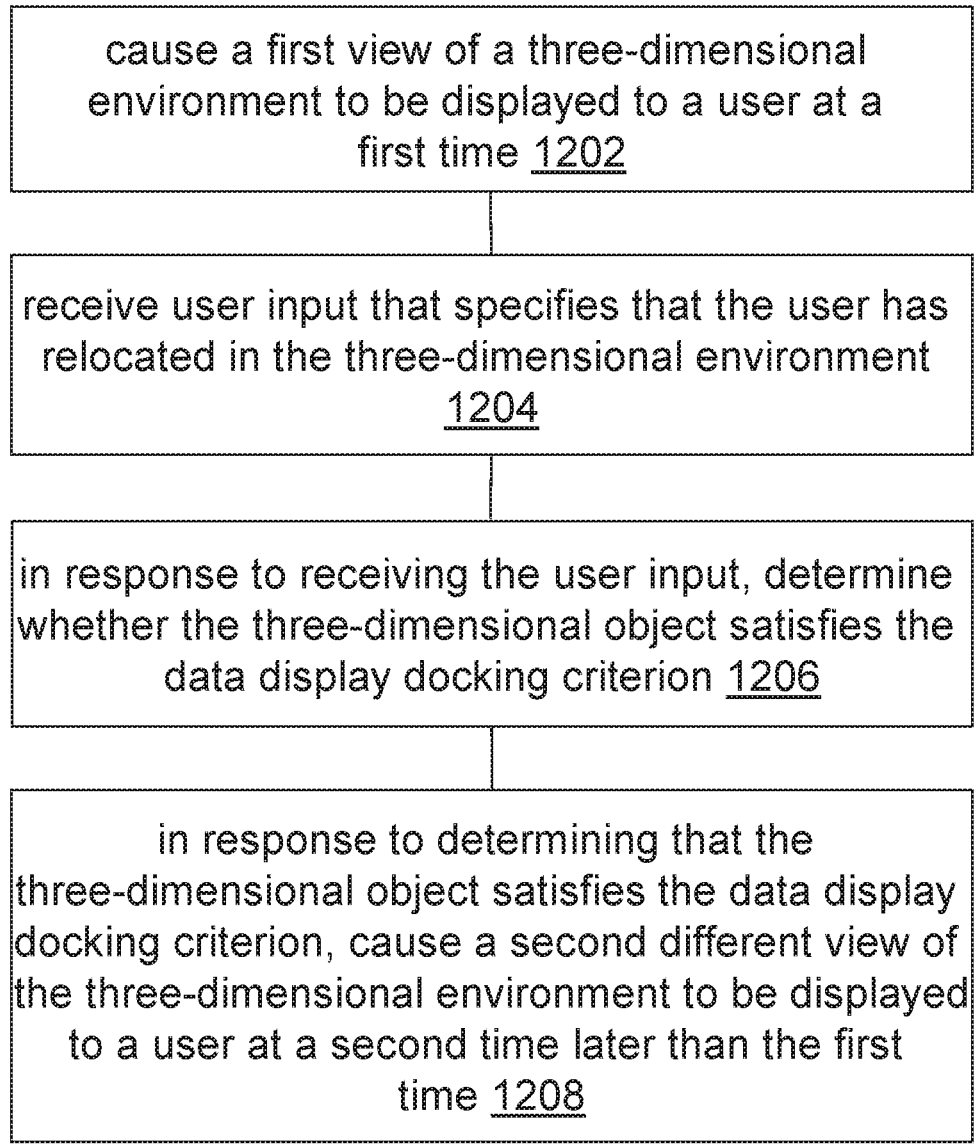
FIG. 12 illustrates an example process flow.

FIG. 12 illustrates an example process flow. In some embodiments, this process flow is performed by a data display system (e.g., as shown in FIG. 1, etc.) comprising one or more computing devices or units. In block 1202, the data display system causes a first view of a three-dimensional environment to be displayed to a user at a first time. The first view of the three-dimensional environment is a view of the three-dimensional environment relative to a first location and a first perspective of the user as represented in the three-dimensional environment at the first time. The first view comprises a data display with a data display area aligned with an object area of the three-dimensional object. The three-dimensional object does not satisfy a data display docking criterion.

In block 1204, the data display system receives user input that specifies that the user as represented in the three-dimensional environment has relocated in the three-dimensional environment and is now at a second location and a second perspective. A combination of the second location and the second perspective is different from a combination of the first location and the first perspective.

In block 1206, the data display system, in response to receiving the user input, determines whether the three-dimensional object satisfies the data display docking criterion.

In block 1208, the data display system, in response to determining that the three-dimensional object satisfies the data display docking criterion, causes a second different view of the three-dimensional environment to be displayed to a user at a second time later than the first time. The second view is a view of the three-dimensional environment relative to the second location and the second perspective of the user as represented in the three-dimensional environment at the second time. The data display area of the data display in the second view is relocated to a designated area that does not align with the object area of the three-dimensional object.

In an embodiment, a second three-dimensional object is represented in the three-dimensional environment; the first view comprises a second data display visually aligned with the second three-dimensional object. The data display system can be configured to perform: in response to receiving the user input, performing: determining whether the second three-dimensional object, as viewed from the second location and the second perspective, satisfies the data display docking criterion; in response to determining that the second three-dimensional object, as viewed from the second location and the second perspective, does not satisfy the data display docking criterion, maintaining the second data display in a position visually aligned with the second three-dimensional object in the second view.

In an embodiment, a second three-dimensional object is represented in the three-dimensional environment; the first view comprises a second data display, for the second three-dimensional object, in the predefined area. The data display system can be configured to perform: in response to receiving the user input, determining whether the second three-dimensional object, as viewed from the second location and the second perspective, satisfies the data display docking criterion; in response to determining that the second three-dimensional object, as viewed from the second location and the second perspective, satisfies the data display docking criterion, maintaining the second data display in the predefined area in the second view.

In an embodiment, a second three-dimensional object is represented in the three-dimensional environment; the first view comprises a second data display, for the second three-dimensional object, in the predefined area. The data display system can be configured to perform: in response to receiving the user input, determining whether the second three-dimensional object, as viewed from the second location and the second perspective, satisfies the data display docking criterion; in response to determining that the second three-dimensional object, as viewed from the second location and the second perspective, does not satisfy the data display docking criterion, moving the second data display away from the predefined area to a second location visually aligned with the second three-dimensional object in the second view.

In an embodiment, the designated area comprises a plurality of docked display areas away from a plurality of three-dimensional objects to which the plurality of docked display areas corresponds; the plurality of docked display areas is displayed in the designated area in an order based on a docked display ordering criterion.

In an embodiment, the designated area comprises a plurality of docked display areas away from a plurality of three-dimensional objects to which the plurality of docked display areas corresponds; the plurality of docked display areas is displayed in the designated area in an order based on a lateral order of the plurality of three-dimensional objects along a spatial direction in the three-dimensional environment.

In an embodiment, the designated area comprises a plurality of docked display areas non-overlapping with one another in displayed views of the three-dimensional environment.

In an embodiment, the data display system is further configured to, in response to receiving input specifying changes in the user's location and perspective as represented in the three-dimensional environment, dynamically order a plurality of docked display areas in the designated area in a plurality of displayed views of the three-dimensional environment based on a docked display ordering criterion.

In an embodiment, content displayed in the data display area relocated to the designated area in the second view is the same as content displayed in the data display area aligned with the object area of the three-dimensional object in the first view.

In an embodiment, content displayed in the data display area relocated to the designated area in the second view is different from content displayed in the data display area aligned with the object area of the three-dimensional object in the first view.

In an embodiment, the designated area, as located in a display used to render views of the three-dimensional environment to the user, does not vary with the user's location and perspective as represented in the three-dimensional environment.

In an embodiment, the data display area is aligned in the first view with one of an adjacent area position, a left area portion, a right area portion, a top area portion, a bottom area portion or a center area portion of the three-dimensional object as represented in the first view.

In an embodiment, a three-dimensional object and the user are represented in the three-dimensional environment with a first distance between each other at the first time; and wherein the user is located at a second finite distance to the three-dimensional object in the three-dimensional environment at the second time.

In an embodiment, the data display docking criterion is based on one or more of a distance of a three-dimensional object relative to the user's location as represented in the three-dimensional environment, an angle of a three-dimensional object relative to the user's perspective as represented in the three-dimensional environment, or a configurable designation of the three-dimensional object.

In an embodiment, the data display docking criterion is based on a distance of a three-dimensional object relative to the user's location as represented in the three-dimensional environment.

In an embodiment, the data display comprises content from one or more of real-time streaming data, non-real-time streaming data, etc.

In an embodiment, the first view and the second view are rendered on one of a display of a computing device, a display of a wearable computer, a heads-up display, a display glass, etc.

In an embodiment, the user's location and perspective as represented in the three-dimensional environment are determined based on one or more of the user's actions relating to one or more user input devices, the user's physical position and physical perspective as detected based on one or more sensors, etc.

In an embodiment, the user's location and perspective as represented in the three-dimensional environment are determined based on the user's physical position and physical perspective as detected based on one or more of an accelerometer, a geosynchronous positioning sensor, a geomagnetic field sensor, an orientation sensor, a gyroscope, a gravity sensor, a rotation vector sensor, etc.

In an embodiment, the three-dimensional environment is dynamically superimposed with a portion of a real-world three-dimensional environment in which the user moves, and wherein the user input is generated through one or more sensors configured to track the user's motion.

In an embodiment, the invention is directed to a computer-implemented method of displaying dockable data displays for labeling objects in a three-dimensional display of a virtual or real environment. The computer-implemented method comprises determining a distance between a virtual camera location within the virtual environment and at least one object located in the virtual environment, determining that the at least one object satisfies a first criterion and at least partially in response to determining that the at least one object satisfies the first criterion, docking the data display associated with the at least one object to a predefined location in a view of the virtual environment, as perceived by the virtual camera.

In another embodiment, the invention is directed to a computer-implemented method of displaying dockable billboards for labeling objects in a three-dimensional display of a virtual or real environment. The computer-implemented method comprises determining a location of a camera viewpoint in the environment, where the camera viewpoint represents the location of a user navigating through the environment, determining a distance between the camera viewpoint location and one or more objects in the environment, and at least partially in response to the distance between the camera viewpoint location and each one of the one or more objects being less than a threshold distance, moving a data billboard, for each one of the one or more objects whose distance from the camera viewpoint location is less than the threshold distance, to a designated location of a viewing area (which may be a part or the entire display area of a display/screen of a computing device) of the environment as perceived from the location of the camera and its viewpoint.

In an embodiment, an apparatus comprises a processor and is configured to perform any of the foregoing methods.

In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods. Note that, although separate embodiments are discussed herein, any combination of embodiments and/or partial embodiments discussed herein may be combined to form further embodiments.

9. Example Computer Architecture

Figure 11:
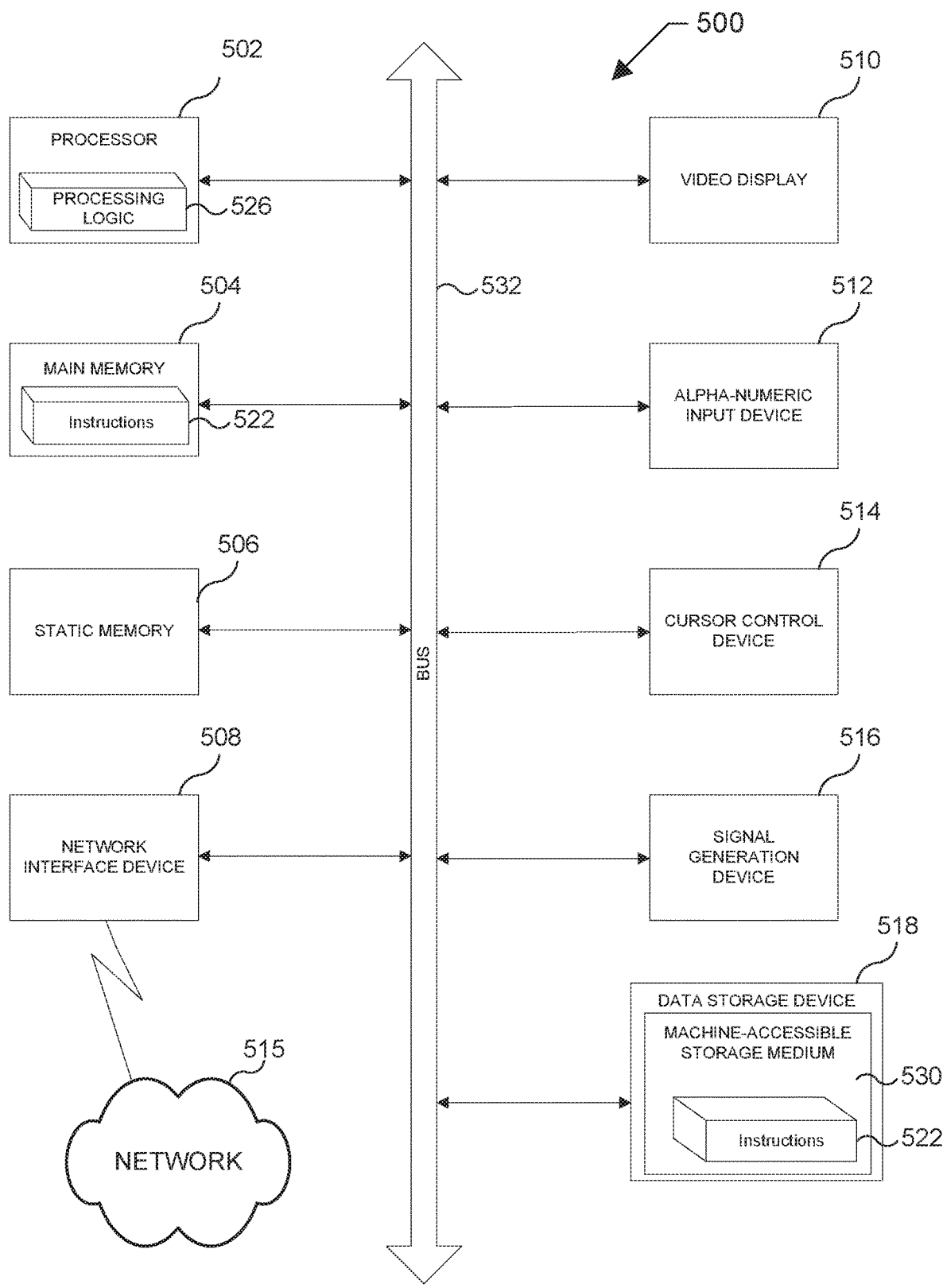
FIG. 11 is a block diagram of a computer that may be used, for example, as a client device or server computer within the context of the system of FIG. 1 or as the computer as used in the context of the system of FIG. 2.

FIG. 11 illustrates a diagrammatic representation of a computer 500 that can be used within the system 100 of FIG. 1, for example, as one of the client devices 140 or server 115, shown in FIG. 1.

In particular embodiments, the computer 500 may be connected (e.g., networked, etc.) to other computers by a LAN, an intranet, an extranet, and/or the Internet. The computer 500 may be a personal computer (PC), a tablet PC, a Personal Digital Assistant (PDA), a cellular telephone, a web appliance, a server, or any computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

The example computer 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 532.

The processing device 502 represents one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 may be configured to execute the processing logic 526 for performing various operations and steps discussed herein.

The computer 500 may further include a network interface device 508 that communications across network 515. The computer 500 also may include a video display unit 510 (e.g., a liquid crystal display (LCD) or a cathode ray tube (CRT), etc.), an alphanumeric input device 512 (e.g., a keyboard, etc.), a cursor control device 514 (e.g., a mouse, etc.), a signal generation device 516 (e.g., a speaker, etc.), etc.

The data storage device 518 may include a non-transitory computer-accessible storage medium 530 (also known as a non-transitory computer-readable storage medium or a non-transitory computer-readable medium) on which is stored one or more sets of instructions (e.g., software 522, etc.) embodying any one or more of the methodologies or functions described herein. The software 522 may also reside, completely or at least partially, within the main memory 504 and/or within the processing device 502 during execution thereof by the computer 500, the main memory 504 and the processing device 502 also constituting computer-accessible storage media. The software 522 may further be transmitted or received over a network 520 via the network interface device 508.

While the computer-accessible storage medium 530 is shown in an example embodiment to be a single medium, the term "computer-accessible storage medium" should be understood to include a single medium or multiple media (e.g., a centralized or distributed database, and/or associated caches and servers, etc.) that store the one or more sets of instructions. The term "computer-accessible storage medium" shall also be understood to include any medium that is capable of storing, encoding or carrying a set of instructions for execution by the computer and that cause the computer to perform any one or more of the methodologies of the present invention. The term "computer-accessible storage medium" shall accordingly be understood to include, but not be limited to, solid-state memories, optical and magnetic media, etc.

10. Equivalents, Extensions, Alternatives and Mischellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A computer-implemented method, comprising:
    rendering a plurality of three-dimensional objects in a three-dimensional environment based on user navigational input, wherein, for each three-dimensional object included in the plurality of three-dimensional objects, a corresponding data display area appears proximate to the three-dimensional object in the three-dimensional environment;
    detecting a change in user perspective;
    in response to the change in user perspective,
        determining that each of two or more three-dimensional objects included in the plurality of three-dimensional objects is within a specified angle of the user perspective and that a distance between each of the two or more three-dimensional objects and the user perspective is less than a threshold distance, and
        responsive to the determining, moving two or more data display areas respectively corresponding to each of the two or more three-dimensional objects from appearing proximate to the respective two or more three-dimensional objects to a foreground area of the three-dimensional environment while displaying, for a third three-dimensional object included in the plurality of three-dimensional objects, a third data display area proximate to the third three-dimensional object in the three-dimensional environment; and
        rearranging positions of the two or more data display areas located in the foreground area, wherein the rearranged positions reflect the change in user perspective.

2. The computer-implemented method of claim 1, wherein, for a given data display area corresponding to a given three-dimensional object, the user perspective and relative lateral positions of two or more three-dimensional objects included in the plurality of three-dimensional objects indicate a display order of the two or more three-dimensional objects included in the plurality of three-dimensional objects as viewed from the user perspective, and a foreground location within the foreground area for the data display area corresponding to the given three-dimensional object is determined based on the display order.

3. The computer-implemented method of claim 1, wherein, for a given data display area corresponding to a given three-dimensional object, a foreground location within the foreground area for the data display area corresponding to the given three-dimensional object is based on an angle between the given three-dimensional object and the user perspective.

4. The computer-implemented method of claim 1, wherein the data display area corresponding to each three-dimensional object included in the plurality of three-dimensional objects are non-overlapping with one another in the foreground area of the three-dimensional environment.

5. The computer-implemented method of claim 1, wherein the data display area corresponding to each three-dimensional object included in the plurality of three-dimensional objects comprise content from one or more of: real-time streaming data or non-real-time streaming data.

6. The computer-implemented method of claim 1, wherein the data display areas, when appearing proximate to each three-dimensional object included in the plurality of three-dimensional objects, are aligned with one of: an area adjacent to the three-dimensional object, an area left of the three-dimensional object, an area right of the three-dimensional object, an area above the three-dimensional object, an area below the three-dimensional object, or an area centered on the three-dimensional object.

7. The computer-implemented method of claim 1, wherein content displayed in each data display area in the foreground area is the content displayed in the data display area that appears proximate to each corresponding three-dimensional object included in the plurality of three-dimensional objects.

8. The computer-implemented method of claim 1, wherein content displayed in each data display area in the foreground area is different than content displayed in the data display area that appears proximate to each corresponding three-dimensional object included in the plurality of three-dimensional objects.

9. The computer-implemented method of claim 1, wherein the plurality of three-dimensional objects is rendered on one or more of: a display of a computing device, a display of a wearable computer, a heads-up display, or a display glass.

10. The computer-implemented method of claim 1, wherein:
the user perspective corresponds to a position along a path in the three-dimensional environment in which the plurality of three-dimensional objects is rendered, and the position along the path and the user perspective are determined based on one or more of:
a user's actions relating to one or more user input devices, or
a user's physical position and physical perspective, as detected based on one or more sensors.

11. The computer-implemented method of claim 1, wherein:
the user perspective corresponds to a position along a path in the three-dimensional environment in which the plurality of three-dimensional objects is rendered, and the position along the path and the user perspective are determined based on a user's physical position and physical perspective, as detected based on one or more of: an accelerometer, a geosynchronous positioning sensor, a geomagnetic field sensor, an orientation sensor, a gyroscope, a gravity sensor, or a rotation vector sensor.

12. The computer-implemented method of claim 1, wherein:
the user perspective corresponds to a position along a path in the three-dimensional environment in which the plurality of three-dimensional objects is rendered, the three-dimensional environment is dynamically superimposed with a portion of a real-world three-dimensional environment in which a user moves, and the user navigational input is generated based on one or more sensors configured to track a motion of the user within the real-world three-dimensional environment.

13. One or more non-transitory computer readable storage media storing software instructions that, when executed by one or more processors, cause the one or more processors to perform the steps of:
rendering a plurality of three-dimensional objects in a three-dimensional environment based on user navigational input, wherein, for each three-dimensional object included in the plurality of three-dimensional objects, a corresponding data display area appears proximate to the three-dimensional object in the three-dimensional environment;

detecting a change in user perspective;
in response to the change in user perspective,
determining that each of two or more three-dimensional objects included in the plurality of three-dimensional objects is within a specified angle of the user perspective and that a distance between each of the two or more three-dimensional objects and the user perspective is less than a threshold distance, and
responsive to the determining, moving two or more data display areas respectively corresponding to each of the two or more three-dimensional objects from appearing proximate to the respective two or more three-dimensional objects to a foreground area of the three-dimensional environment while displaying, for a third three-dimensional object included in the plurality of three-dimensional objects, a third data display area proximate to the third three-dimensional object in the three-dimensional environment; and
rearranging positions of the two or more data display areas located in the foreground area, wherein the rearranged positions reflect the change in user perspective.

14. The one or more non-transitory computer readable media of claim 13, wherein, for a given data display area corresponding to a given three-dimensional object, the user perspective and relative lateral positions of two or more three-dimensional objects of the plurality of three-dimensional objects indicate a display order of the two or more three-dimensional objects of the plurality of three-dimensional objects as viewed from the user perspective and a foreground location within the foreground area for the data display area corresponding to the given three-dimensional object is determined based on the display order.

15. The one or more non-transitory computer readable media of claim 13, wherein, for a given data display area corresponding to a given three-dimensional object, a foreground location within the foreground area is based on an angle between the given three-dimensional object and the user perspective.

16. The one or more non-transitory computer readable media of claim 13, wherein the data display area corresponding to each three-dimensional object included in the plurality of three-dimensional objects are non-overlapping with one another in the foreground area of the three-dimensional environment.

17. The one or more non-transitory computer readable media of claim 13, wherein the data display area corresponding to each three-dimensional object included in the plurality of three-dimensional objects comprise content from one or more of: real-time streaming data or non-real-time streaming data.

18. The one or more non-transitory computer readable media of claim 13, wherein the data display areas, when appearing proximate to each three-dimensional object included in the plurality of three-dimensional objects, are aligned with one of: an area adjacent to the three-dimensional object, an area left of the three-dimensional object, an area right of the three-dimensional object, an area above the three-dimensional object, an area below the three-dimensional object, or an area centered on the three-dimensional object.

19. A system comprising:
a memory; and
a processor that is coupled to the memory and that:
renders a plurality of three-dimensional objects in a three-dimensional environment based on user navigational input, wherein, for each three-dimensional object included in the plurality of three-dimensional objects, a corresponding data display area appears proximate to the three-dimensional object in the three-dimensional environment;

detects a change in user perspective;

in response to the change in user perspective,
  determines that each of two or more three-dimensional objects included in the plurality of three-dimensional objects is within a specified angle of the user perspective and that a distance between each of the two or more three-dimensional objects and the user perspective is less than a threshold distance, and responsive to the determination, moves two or more data display areas respectively corresponding to each of the two or more three-dimensional objects from appearing proximate to the respective two or more three-dimensional objects to a foreground area of the three-dimensional environment while displaying, for a third three-dimensional object included in the plurality of three-dimensional objects, a third data display area proximate to the third three-dimensional object in the three-dimensional environment; and rearranges positions of the two or more data display areas located in the foreground area, wherein the rearranged positions reflect the change in user perspective.

20. The system of claim 19, wherein, for a given data display area corresponding to a given three-dimensional object, the user perspective and relative lateral positions of two or more three-dimensional objects of the plurality of three-dimensional objects indicate a display order of the two or more three-dimensional objects of the plurality of three-dimensional objects as viewed from the user perspective and a foreground location within the foreground area for the data display area corresponding to the given three-dimensional object is determined based on the display order.

* * * * *